(12) United States Patent
Kopelman

(10) Patent No.: US 11,806,208 B2
(45) Date of Patent: Nov. 7, 2023

(54) ORTHODONTIC APPLIANCES WITH SHELL SEGMENTS AND ELASTIC SEGMENTS

(71) Applicant: Align Technology, Inc., San Jose, CA (US)

(72) Inventor: Avi Kopelman, Palo Alto, CA (US)

(73) Assignee: Align Technology, Inc., San Jose, CA (US)

( * ) Notice: Subject to any disclaimer, the term of this patent is extended or adjusted under 35 U.S.C. 154(b) by 0 days.

(21) Appl. No.: 17/935,268

(22) Filed: Sep. 26, 2022

(65) Prior Publication Data

US 2023/0014475 A1   Jan. 19, 2023

Related U.S. Application Data

(63) Continuation of application No. 14/610,027, filed on Jan. 30, 2015, now Pat. No. 11,497,586.

(60) Provisional application No. 61/969,023, filed on Mar. 21, 2014.

(51) Int. Cl.
*A61C 7/08* (2006.01)

(52) U.S. Cl.
CPC ...................................... *A61C 7/08* (2013.01)

(58) Field of Classification Search
CPC ........................................................ A61C 7/08
See application file for complete search history.

(56) References Cited

U.S. PATENT DOCUMENTS

| | | | |
|---|---|---|---|
| 5,820,368 A | 10/1998 | Wolk | |
| 6,607,382 B1 | 8/2003 | Kuo et al. | |
| 6,783,604 B2 | 8/2004 | Tricca | |
| 6,790,035 B2 | 9/2004 | Tricca et al. | |
| 6,814,574 B2 | 11/2004 | Abolfathi et al. | |
| 6,947,038 B1 | 9/2005 | Anh et al. | |
| 7,074,039 B2 | 7/2006 | Kopelman et al. | |
| 7,104,792 B2 | 9/2006 | Taub et al. | |
| 7,160,107 B2 | 1/2007 | Kopelman et al. | |
| 7,192,273 B2 | 3/2007 | McSurdy, Jr. | |
| 7,354,270 B2 | 4/2008 | Abolfathi et al. | |
| 7,448,514 B2 | 11/2008 | Wen | |
| 7,481,121 B1 | 1/2009 | Cao | |
| 7,543,511 B2 | 6/2009 | Kimura et al. | |
| 7,600,999 B2 | 10/2009 | Knopp | |
| 7,766,658 B2 | 8/2010 | Tricca et al. | |
| 7,771,195 B2 | 8/2010 | Knopp et al. | |
| 7,854,609 B2 | 12/2010 | Chen et al. | |
| 7,871,269 B2 | 1/2011 | Wu et al. | |

(Continued)

OTHER PUBLICATIONS

US 11,497,585 B2, 11/2022, Kopelman et al. (withdrawn)

*Primary Examiner* — Nicholas D Lucchesi
*Assistant Examiner* — Hao D Mai
(74) *Attorney, Agent, or Firm* — FORTEM IP LLP

(57) ABSTRACT

Orthodontic appliances and associated methods are provided. In some embodiments, an orthodontic appliance includes an appliance shell configured to reposition a patient's teeth from a first arrangement toward a second arrangement. The appliance shell can include a plurality of shell segments, each shell segment including a first material having a first elastic modulus. The appliance shell can also include a plurality of elastic segments, each elastic segment including a second material having a second elastic modulus less than the first elastic modulus. Each elastic segment can be coupled to a respective adjacent pair of shell segments.

21 Claims, 10 Drawing Sheets

(56) References Cited

U.S. PATENT DOCUMENTS

| | | |
|---|---|---|
| 7,878,805 B2 | 2/2011 | Moss et al. |
| 7,883,334 B2 | 2/2011 | Li et al. |
| 7,914,283 B2 | 3/2011 | Kuo |
| 7,947,508 B2 | 5/2011 | Tricca et al. |
| 8,172,569 B2 | 5/2012 | Matty et al. |
| 8,235,715 B2 | 8/2012 | Kuo |
| 8,292,617 B2 | 10/2012 | Brandt et al. |
| 8,337,199 B2 | 12/2012 | Wen |
| 8,401,686 B2 | 3/2013 | Moss et al. |
| 8,562,337 B2 | 10/2013 | Kuo et al. |
| 8,771,149 B2 | 7/2014 | Rahman et al. |
| 8,936,463 B2 | 1/2015 | Mason et al. |
| 8,936,464 B2 | 1/2015 | Kopelman |
| 9,022,781 B2 | 5/2015 | Kuo et al. |
| 9,119,691 B2 | 9/2015 | Namiranian et al. |
| 9,326,831 B2 | 5/2016 | Cheang |
| 9,433,476 B2 | 9/2016 | Khardekar et al. |
| 9,610,141 B2 | 4/2017 | Kopelman et al. |
| 9,700,385 B2 | 7/2017 | Webber |
| 9,744,001 B2 | 8/2017 | Choi et al. |
| 9,844,424 B2 | 12/2017 | Wu et al. |
| 10,045,835 B2 | 8/2018 | Boronkay et al. |
| 10,150,244 B2 | 12/2018 | Sato et al. |
| 10,201,409 B2 | 2/2019 | Mason et al. |
| 10,213,277 B2 | 2/2019 | Webber et al. |
| 10,383,705 B2 | 8/2019 | Shanjani et al. |
| D865,180 S | 10/2019 | Bauer et al. |
| 10,463,452 B2 | 11/2019 | Matov et al. |
| 10,470,847 B2 | 11/2019 | Shanjani et al. |
| 10,492,888 B2 | 12/2019 | Chen et al. |
| 10,517,701 B2 | 12/2019 | Boronkay |
| 10,537,406 B2 | 1/2020 | Wu et al. |
| 10,537,463 B2 | 1/2020 | Kopelman |
| 10,548,700 B2 | 2/2020 | Fernie |
| 10,555,792 B2 | 2/2020 | Kopelman et al. |
| 10,588,776 B2 | 3/2020 | Cam et al. |
| 10,613,515 B2 | 4/2020 | Cramer et al. |
| 10,639,134 B2 | 5/2020 | Shanjani et al. |
| 10,743,964 B2 | 8/2020 | Wu et al. |
| 10,781,274 B2 | 9/2020 | Liska et al. |
| 10,813,720 B2 | 10/2020 | Grove et al. |
| 10,912,629 B2 | 2/2021 | Tanugula et al. |
| 10,993,783 B2 | 5/2021 | Wu et al. |
| 11,026,831 B2 | 6/2021 | Kuo |
| 11,045,283 B2 | 6/2021 | Riley et al. |
| 11,103,330 B2 | 8/2021 | Webber et al. |
| 11,123,156 B2 | 9/2021 | Cam et al. |
| 11,166,788 B2 | 11/2021 | Webber |
| 11,174,338 B2 | 11/2021 | Liska et al. |
| 11,219,506 B2 | 1/2022 | Shanjani et al. |
| 11,273,011 B2 | 3/2022 | Shanjani et al. |
| 11,278,375 B2 | 3/2022 | Wang et al. |
| 11,331,166 B2 | 5/2022 | Morton et al. |
| 11,344,385 B2 | 5/2022 | Morton et al. |
| 11,376,101 B2 | 7/2022 | Sato et al. |
| 11,419,702 B2 | 8/2022 | Sato et al. |
| 11,419,710 B2 | 8/2022 | Mason et al. |
| 11,471,253 B2 | 10/2022 | Venkatasanthanam et al. |
| 2002/0187451 A1* | 12/2002 | Phan ................ B29C 48/154 433/6 |
| 2004/0166463 A1 | 8/2004 | Wen et al. |
| 2005/0014105 A1 | 1/2005 | Abolfathi et al. |
| 2005/0244768 A1 | 11/2005 | Taub et al. |
| 2006/0019218 A1 | 1/2006 | Kuo |
| 2006/0115782 A1 | 6/2006 | Li et al. |
| 2006/0234179 A1 | 10/2006 | Wen et al. |
| 2008/0118882 A1 | 5/2008 | Su |
| 2008/0160473 A1 | 7/2008 | Li et al. |
| 2008/0286716 A1 | 11/2008 | Sherwood |
| 2008/0286717 A1 | 11/2008 | Sherwood |
| 2009/0280450 A1 | 11/2009 | Kuo |
| 2009/0298006 A1* | 12/2009 | Schwartz ............ A61C 7/08 433/34 |
| 2010/0055635 A1 | 3/2010 | Kakavand |
| 2010/0129763 A1 | 5/2010 | Kuo |
| 2014/0067334 A1 | 3/2014 | Kuo |
| 2016/0193014 A1 | 7/2016 | Morton et al. |
| 2017/0007359 A1 | 1/2017 | Kopelman et al. |
| 2017/0007361 A1 | 1/2017 | Boronkay et al. |
| 2017/0135792 A1 | 5/2017 | Webber |
| 2017/0135793 A1 | 5/2017 | Webber et al. |
| 2017/0165032 A1 | 6/2017 | Webber et al. |
| 2018/0360567 A1 | 12/2018 | Xue et al. |
| 2019/0000592 A1 | 1/2019 | Cam et al. |
| 2019/0000593 A1 | 1/2019 | Cam et al. |
| 2019/0046297 A1 | 2/2019 | Kopelman et al. |
| 2019/0099129 A1 | 4/2019 | Kopelman et al. |
| 2019/0125494 A1 | 5/2019 | Li et al. |
| 2019/0125497 A1 | 5/2019 | Derakhshan et al. |
| 2019/0152152 A1 | 5/2019 | O'Leary et al. |
| 2019/0175304 A1 | 6/2019 | Morton et al. |
| 2019/0262101 A1 | 8/2019 | Shanjani et al. |
| 2019/0298494 A1 | 10/2019 | Webber et al. |
| 2019/0314119 A1 | 10/2019 | Kopelman et al. |
| 2019/0343606 A1 | 11/2019 | Wu et al. |
| 2020/0000553 A1 | 1/2020 | Makarenkova et al. |
| 2020/0100864 A1 | 4/2020 | Wang et al. |
| 2020/0100866 A1 | 4/2020 | Medvinskaya et al. |
| 2020/0155276 A1 | 5/2020 | Cam et al. |
| 2020/0188062 A1 | 6/2020 | Kopelman et al. |
| 2020/0214598 A1 | 7/2020 | Li et al. |
| 2020/0214801 A1 | 7/2020 | Wang et al. |
| 2020/0390523 A1 | 12/2020 | Sato et al. |
| 2021/0147672 A1 | 5/2021 | Cole et al. |

* cited by examiner

ORTHODONTIC APPLIANCES WITH SHELL SEGMENTS AND ELASTIC SEGMENTS

CROSS-REFERENCE TO RELATED APPLICATIONS

This application is a continuation of U.S. patent application Ser. No. 14/610,027, filed Jan. 30, 2015, which claims the benefit of U.S. Provisional Application No. 61/969,023, filed Mar. 21, 2014, which are incorporated herein by reference in their entireties.

BACKGROUND

Orthodontic procedures typically involve repositioning a patient's teeth to a desired arrangement in order to correct malocclusions and/or improve aesthetics. To achieve these objectives, orthodontic appliances such as braces, retainers, shell aligners, and the like can be applied to the patient's teeth by an orthodontic practitioner. The appliance is configured to exert force on one or more teeth in order to effect desired tooth movements. The application of force can be periodically adjusted by the practitioner (e.g., by altering the appliance or using different types of appliances) in order to incrementally reposition the teeth to a desired arrangement.

In some instances, however, current orthodontic appliances may not be able to effectively generate the forces needed to achieve the desired tooth repositioning, or may not afford sufficient control over the forces applied to the teeth. Additionally, the rigidity of some existing appliances may interfere with the ability of the appliance to be coupled to the patient's teeth and may increase patient discomfort.

SUMMARY

Improved orthodontic appliances, as well as related systems and methods, are provided. An orthodontic appliance can be designed to be worn on a patient's teeth and include a plurality of discrete shell segments joined by an elastic material. The appliances described herein provide enhanced control over forces exerted onto the teeth, thus enabling improved orthodontic treatment procedures.

Accordingly, in one aspect, an orthodontic appliance includes a plurality of discrete shell segments, each including one or more cavities shaped to receive at least portions of teeth. The discrete shell segments are joined by an elastic material to form a single appliance shell.

Other objects and features of the present invention will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION

Figure 1A:
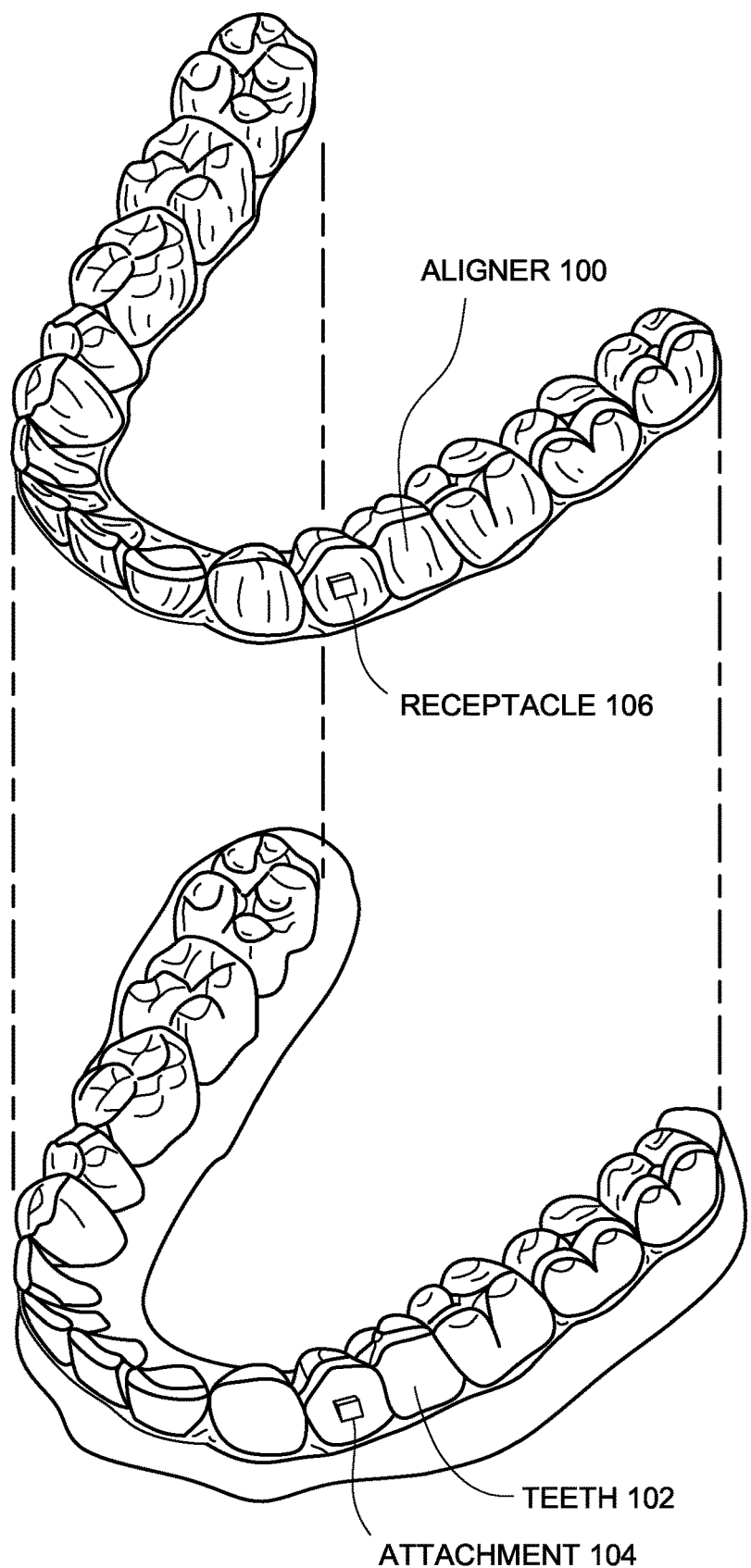
FIG. 1A illustrates a tooth repositioning appliance, in accordance with many embodiments.

The orthodontic appliances described herein, along with related systems and methods, can be employed as part of an orthodontic treatment procedure in order to reposition one or more teeth, maintain a current position of one or more teeth, or suitable combinations thereof. An orthodontic appliance can include a plurality of discrete shell segments, each including a plurality of cavities shaped to receive at least portions of a patient's teeth, that are joined by elastic material (also referred to herein as "elastics") to form a single appliance shell. The geometry, configuration, and material properties of the shell segments and/or elastic material can be selected to at least partially control the magnitude and direction of the forces applied to the teeth by the appliance. In some instances, the applied forces are provided in whole or in part as a result of the elastic material joining the segments. In contrast to existing orthodontic approaches, which typically employ a single appliance shell with homogeneous and/or continuous material properties, the material properties (e.g., stiffness) of the appliances described herein can be varied via the elastics, thus, e.g., affording different force application to different teeth of the patient's arch and, in some instances, more precise application or delivery of one or more forces to teeth. Additionally, the segmented appliances disclosed herein may in some instances accommodate larger tooth movements than conventional unsegmented appliances, thus reducing the number of different appliances needed to complete a course of orthodontic treatment. Furthermore, the combination of relatively rigid shell segments and relatively compliant elastic joining materials can in some instances improve the appliance fit and reduce patient discomfort, while maintaining the appliance's ability to exert forces sufficient for repositioning teeth.

Thus, in one aspect, an orthodontic appliance includes a plurality of discrete shell segments, each including one or more cavities shaped to receive at least portions of teeth. The discrete shell segments are joined by an elastic material to form a single appliance shell. The appliance shell may be a continuous appliance shell.

In some instances, a stiffness of the plurality of discrete shell segments is greater than a stiffness of the elastic material. Shell segments may vary in design. In some instances, one or more of the plurality of discrete shell segments forming an appliances may be configured to receive only a single tooth. In some embodiments, one or more of the plurality of discrete shell segments may be configured to span or receive a plurality of teeth. An appliance may include segments of the same or different types with respect to a number of teeth spanned or received by the segment. For example, an appliance may include some discrete shell segment(s) that span or receive a single tooth, and some discrete shell segment(s) that span or receive a plurality of teeth.

In many embodiments, the elastic material comprises a plurality of discrete elastic segments. The plurality of discrete elastic segments can be positioned between the plurality of discrete shell segments. For example, the plurality of discrete elastic segments can each be positioned near or adjacent to an interproximal region between teeth when the appliance is worn on the teeth. In many embodiments, the plurality of discrete shell segments are embedded in the elastic material.

In another aspect, an appliance as described herein may be included in a series of appliances so as to provide an orthodontic system for positioning teeth. Such an orthodontic system can include a plurality of orthodontic appliances each comprising a shell including a one or more cavities shaped to receive at least portions of teeth. The appliances may be successively worn by a patient to move one or more teeth from a first arrangement to a second arrangement. One or more of the appliances can include a segmented appliance as described herein. For example, a segmented appliance of a system can include a plurality of discrete shell segments, each including one or more cavities shaped to receive at least portions of teeth; and an elastic material joining the plurality of discrete shell segments to form a single appliance shell. The plurality of appliances can include a first appliance and a second appliance having different elastic properties relative to each other.

An appliance can be designed or fabricated with a desired stiffness or so as to impart a desired tooth movement force or set of forces to the patient's teeth. In some instances, a stiffness of the plurality of discrete shell segments is greater than a stiffness of the elastic material. At least some of the plurality of discrete shell segments may be configured to receive a single tooth. Alternatively or in addition, at least some of the plurality of discrete shell segments may be configured to receive a plurality of teeth.

In many embodiments, the elastic material of an appliance comprises a plurality of discrete elastic segments. The same or similar elastic material may be utilized between various different segments, or different elastic materials may be utilized. Herein, similar elastic material may, for example, refer to a different elastic material, the elastic properties of which have variations of no more than 5% from the corresponding values of the properties of the other elastic material, or variations of no more than 10% from the corresponding values of the properties of the other elastic material. The plurality of discrete elastic segments can be positioned between the plurality of discrete shell segments. For example, the plurality of discrete elastic segments can each be positioned near or adjacent to an interproximal region between teeth when the appliance is worn on the teeth. The plurality of discrete shell segments can be coupled to the elastic material in a variety of ways suitable for use in orthodontic positioning as described herein. Discrete shell segments may be embedded in the elastic material, elastic material may be embedded in material of the shell segments, or a combination thereof. Discrete shell segments and elastic material may also be glued, thermoformed together, mechanically connected, stitched, riveted, weaved together, or connected in any other manner such that the aligner is suitable for use as described herein.

In another aspect, a method for creating an orthodontic appliance is included herein. A method of creating or fabricating an appliance can include providing a shell, in whole or in part, including one or more cavities shaped to receive at least portions of teeth. In some instances the shell is fabricated into a plurality of discrete shell segments, and then joined together using elastic material, thereby forming a single, or continuously assembled appliance shell. In some instances, the shell or portion thereof is fabricated and then can be separated into a plurality of discrete shell segments, each including one or more cavities shaped to receive at least portions of teeth. The discrete shell segments can be joined using an elastic material, thereby forming a single, or continuous assembly, appliance shell.

In many embodiments, a stiffness of the plurality of discrete shell segments is greater than a stiffness of the elastic material. At least some of the plurality of discrete shell segments may be configured to receive a single tooth. Alternatively or in addition, at least some of the plurality of discrete shell segments may be configured to receive a plurality of teeth.

In many embodiments, the elastic material comprises a plurality of discrete elastic segments. Joining the plurality of discrete shell segments using an elastic material can include positioning the plurality of discrete elastic segments between the plurality of discrete shell segments. For example, the plurality of discrete elastic segments can each be positioned near or adjacent to an interproximal region between teeth when the appliance is worn on the teeth. In many embodiments, joining the plurality of discrete shell segments using the elastic material can include embedding the plurality of discrete shell segments in the elastic material.

Turning now to the drawings, in which like numbers designate like elements in the various figures, FIG. 1A illustrates an exemplary tooth repositioning appliance or aligner 100 that can be worn by a patient in order to achieve an incremental repositioning of individual teeth 102 in the jaw. The appliance can include a shell (e.g., a continuous polymeric shell or a segmented shell) having teeth-receiving cavities that receive and resiliently reposition the teeth. An appliance or portion(s) thereof may be indirectly fabricated using a physical model of teeth. For example, an appliance (e.g., polymeric appliance) can be formed using a physical model of teeth and a sheet of suitable layers of polymeric material. In some instances, a physical appliance is directly fabricated, e.g., using rapid prototyping fabrication techniques, from a digital model of an appliance. An appliance can fit over all teeth present in an upper or lower jaw, or less than all of the teeth. The appliance can be designed specifically to accommodate the teeth of the patient (e.g., the topography of the tooth-receiving cavities matches the topography of the patient's teeth), and may be fabricated based on positive or negative models of the patient's teeth generated by impression, scanning, and the like. Alternatively, the appliance can be a generic appliance configured to receive the teeth, but not necessarily shaped to match the topography of the patient's teeth. In some cases, only certain teeth received by an appliance will be repositioned by the appliance while other teeth can provide a base or anchor region for holding the appliance in place as it applies force against the tooth or teeth targeted for repositioning. In some cases, many or most, and even all, of the teeth will be repositioned at some point during treatment. Teeth that are moved can also serve as a base or anchor for holding the appliance as it is worn by the patient. Typically, no wires or other means will be provided for holding an appliance in place over the teeth. In some cases, however, it may be desirable or necessary to provide individual attachments or other anchoring elements 104 on teeth 102 with corresponding receptacles or apertures 106 in the appliance 100 so that the appliance can apply a selected force on the tooth. Exemplary appliances, including those utilized in the Invisalign® System, are described in numerous patents and patent applications assigned to Align Technology, Inc. including, for example, in U.S. Pat. Nos. 6,450,807, and 5,975,893, as well as on the company's website, which is accessible on the World Wide Web (see, e.g., the url "invisalign.com"). Examples of tooth-mounted attachments suitable for use with orthodontic appliances are also described in patents and patent applications assigned to Align Technology, Inc., including, for example, U.S. Pat. Nos. 6,309,215 and 6,830,450.

Figure 1B:
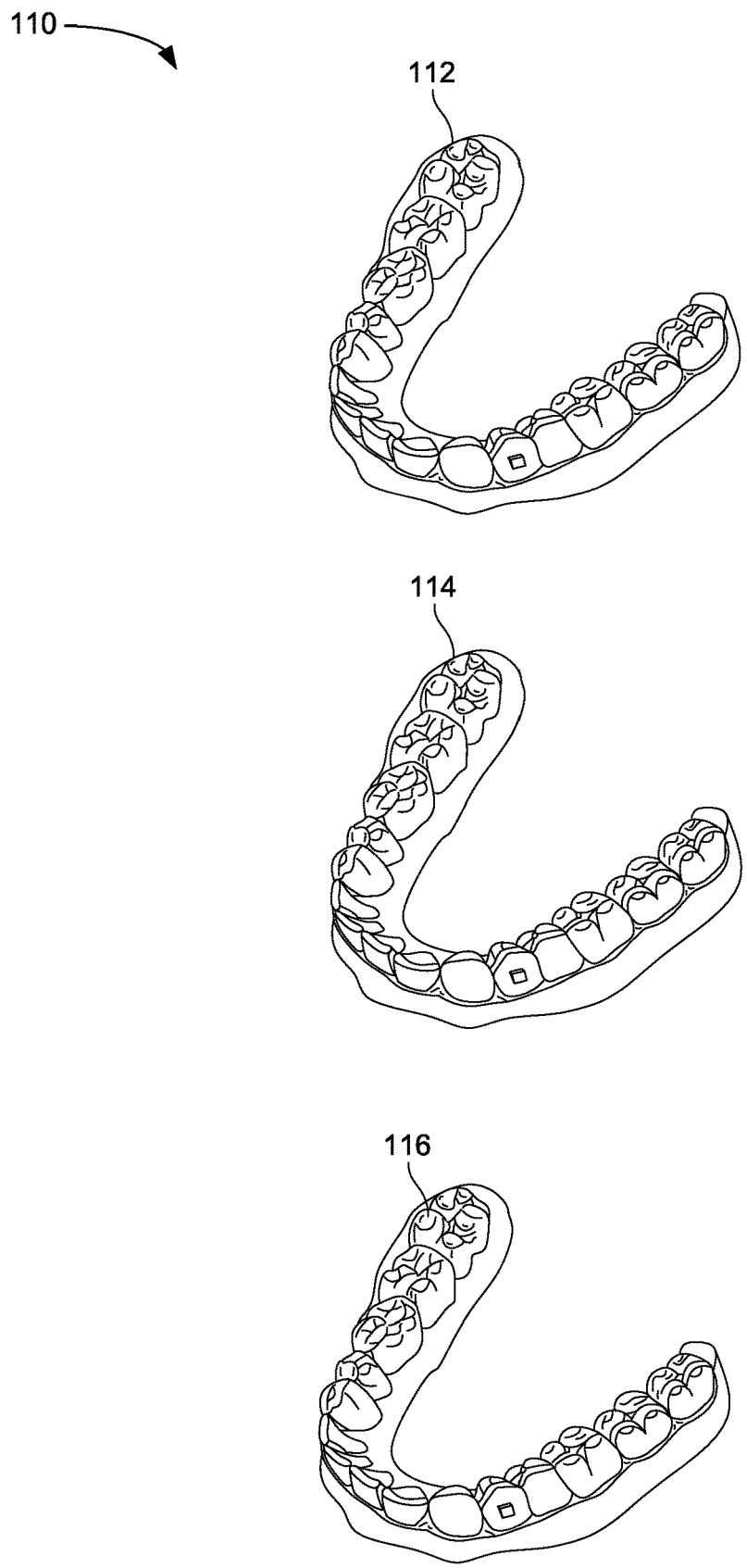
FIG. 1B illustrates a tooth repositioning system, in accordance with many embodiments.

FIG. 1B illustrates a tooth repositioning system 110 including a plurality of appliances 112, 114, 116. Any of the appliances described herein can be designed and/or provided as part of a set of a plurality of appliances used in a tooth repositioning system. Each appliance may be configured so a tooth-receiving cavity has a geometry corresponding to an intermediate or final tooth arrangement intended for the appliance. The patient's teeth can be progressively repositioned from an initial tooth arrangement to a target tooth arrangement by placing a series of incremental position adjustment appliances over the patient's teeth. For example, the tooth repositioning system 110 can include a first appliance 112 corresponding to an initial tooth arrangement, one or more intermediate appliances 114 corresponding to one or more intermediate arrangements, and a final appliance 116 corresponding to a target arrangement. A target tooth arrangement can be a planned final tooth arrangement selected for the patient's teeth at the end of all planned orthodontic treatment. Alternatively, a target arrangement can be one of many intermediate arrangements for the patient's teeth during the course of orthodontic treatment, which may include various different treatment scenarios, including, but not limited to, instances where surgery is recommended, where interproximal reduction (IPR) is appropriate, where a progress check is scheduled, where anchor placement is best, where palatal expansion is desirable, where restorative dentistry is involved (e.g., inlays, onlays, crowns, bridges, implants, veneers, and the like), etc. As such, it is understood that a target tooth arrangement can be any planned resulting arrangement for the patient's teeth that follows one or more incremental repositioning stages. Likewise, an initial tooth arrangement can be any initial arrangement for the patient's teeth that is followed by one or more incremental repositioning stages.

Figure 2:
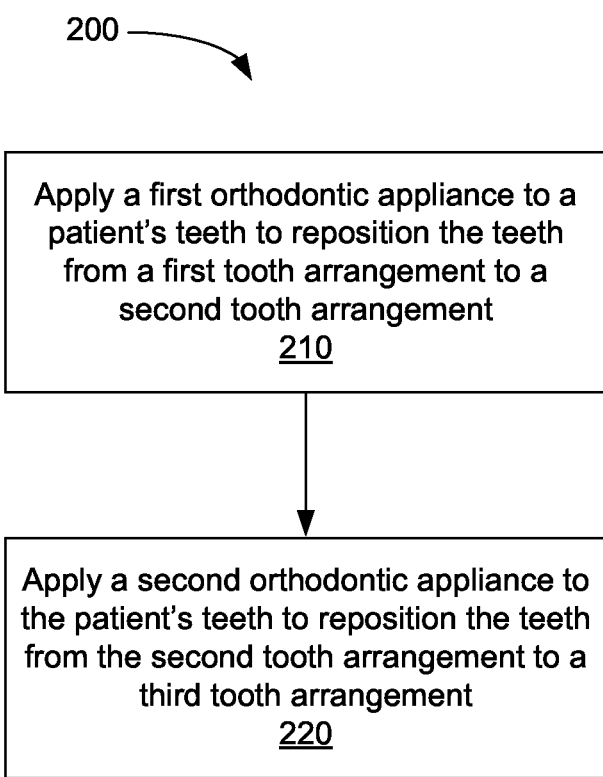
FIG. 2 illustrates a method of orthodontic treatment using a plurality of appliances, in accordance with many embodiments.

FIG. 2 illustrates a method 200 of orthodontic treatment using a plurality of appliances, in accordance with many embodiments. The method 200 can be practiced using any of the appliances or appliance sets described herein. In act 210, a first orthodontic appliance is applied to a patient's teeth in order to reposition the teeth from a first tooth arrangement to a second tooth arrangement. In act 220, a second orthodontic appliance is applied to the patient's teeth in order to reposition the teeth from the second tooth arrangement to a third tooth arrangement. The method 200 can be repeated as necessary using any suitable number and combination of sequential appliances in order to incrementally reposition the patient's teeth from an initial arrangement to a target arrangement. The appliances can be generated all at the same stage or in sets or batches (e.g., at the beginning of a stage of the treatment), or one at a time, and the patient can wear each appliance until the pressure of each appliance on the teeth can no longer be felt or until the maximum amount of expressed tooth movement for that given stage has been achieved. A plurality of different appliances (e.g., a set) can be designed and even fabricated prior to the patient wearing any appliance of the plurality. After wearing an appliance for an appropriate period of time, the patient can replace the current appliance with the next appliance in the series until no more appliances remain. The appliances are generally not affixed to the teeth and the patient may place and replace the appliances at any time during the procedure (e.g., patient-removable appliances). The final appliance or several appliances in the series may have a geometry or geometries selected to overcorrect the tooth arrangement. For instance, one or more appliances may have a geometry that would (if fully achieved) move individual teeth beyond the tooth arrangement that has been selected as the "final." Such over-correction may be desirable in order to offset potential relapse after the repositioning method has been terminated (e.g., permit movement of individual teeth back toward their pre-corrected positions). Over-correction may also be beneficial to speed the rate of correction (e.g., an appliance with a geometry that is positioned beyond a desired intermediate or final position may shift the individual teeth toward the position at a greater rate). In such cases, the use of an appliance can be terminated before the teeth reach the positions defined by the appliance. Furthermore, over-correction may be deliberately applied in order to compensate for any inaccuracies or limitations of the appliance.

In many embodiments, the orthodontic appliances provided herein include a plurality of discrete shell segments that are movable relative to each other. Such appliances can be referred to as "segmented" orthodontic appliances. Each shell segment can be shaped to receive at least a portion of a tooth, a single tooth or a plurality of adjacent teeth. For example, a segment can include a portion of a tooth receiving cavity, a single tooth receiving cavity, a plurality of tooth receiving cavities, or combinations thereof. In many embodiments, adjacent shell segments receive adjacent teeth, such that the shell segments collectively cover a continuous span of teeth of a single dental arch (e.g., an upper or lower arch). The separations between the shell segments can correspond approximately to the natural separations between teeth, e.g., are located at or near the interproximal regions of the tooth receiving cavities.

The shell segments can be joined together by an elastic material in order to form a single orthodontic appliance shell that receives a continuous span of teeth. Exemplary elastic materials suitable for use with the embodiments provided herein include but are not limited to isoprene rubber, polyurethane, copolyester, styrenic block copolymer, styrene-butadiene rubber, silicone rubber, or combinations thereof. Many different configurations of the elastic material and shell segments can be used. For example, the elastic material can include a plurality of discrete portions, each attached to and coupling only a subset of the shell segments (e.g., each discrete portions joins only two, three, four, or more adjacent segments). As another example, the elastic material can be a single continuous piece that is attached to and couples all of the shell segments. The elastic material can be attached to the shell segments at one or more discrete attachment points, or over one or more continuous attachment regions. The attachment points and/or regions can be located on any suitable portion of the shell segments, such as the buccal surface, lingual surface, occlusal surface, or combinations thereof.

The elastic material can be deformable (e.g., by stretching, compression, bending, flexing) to allow the segments to move relative to each other. The configuration and/or properties of the elastic material can influence the extent to which relative movement is possible, e.g., constrain the direction of movement, prevent the segments from being displaced more than a certain distance apart or less than a certain distance together, etc. In many embodiments, the elastic material joins the shell segments so as to form a single appliance shell having a geometry corresponding to a target tooth arrangement and is configured to resist displacement of the shell segments away from a target arrangement. Accordingly, when the appliance is worn by a patient having a tooth arrangement different from the target arrangement specified by the appliance, the shell segments may be displaced away from their original positions in the target arrangement, thereby producing deformation of the elastic material. The stiffness of the shell segments can be greater than the stiffness of the elastic material, such that deformations occur primarily in the elastic material rather than in the shell segments. For example, a shell segment can have an elastic modulus within a range from about 10,000 psi to about 700,000 psi, and the elastic material can have an elastic modulus within a range from about 100 psi to about 8000 psi, or from about 100 psi to about 50,000 psi. The resistance of the elastic material to such deformation can generate forces that are transmitted to the underlying teeth in order to elicit tooth repositioning towards the target arrangement specified by the appliance.

Figure 3A:
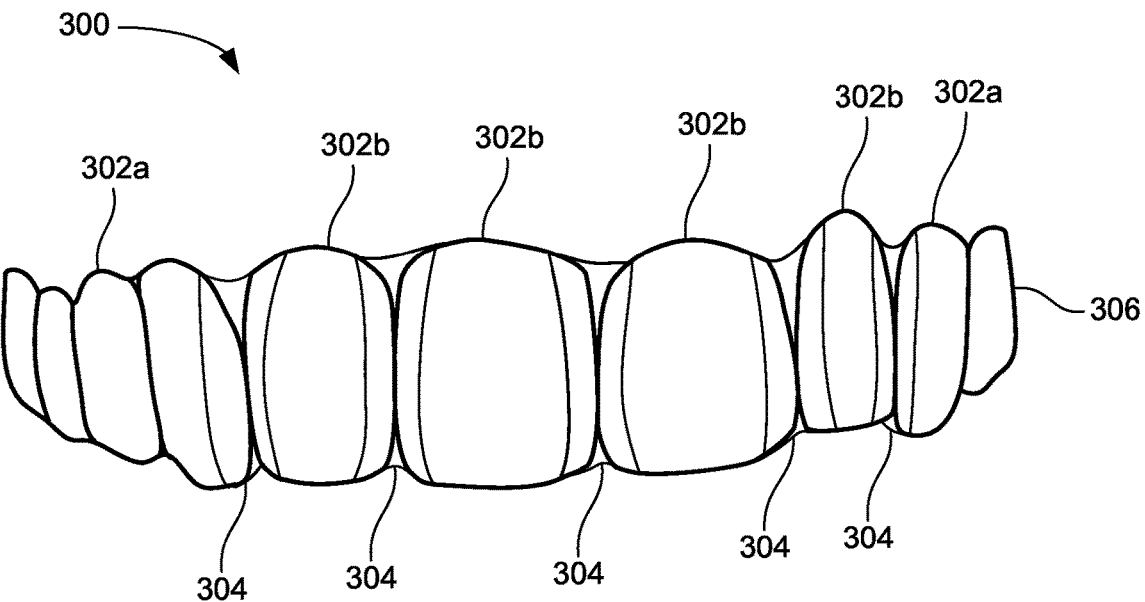
FIG. 3A illustrates a segmented orthodontic appliance, in accordance with many embodiments.
Figure 3B:
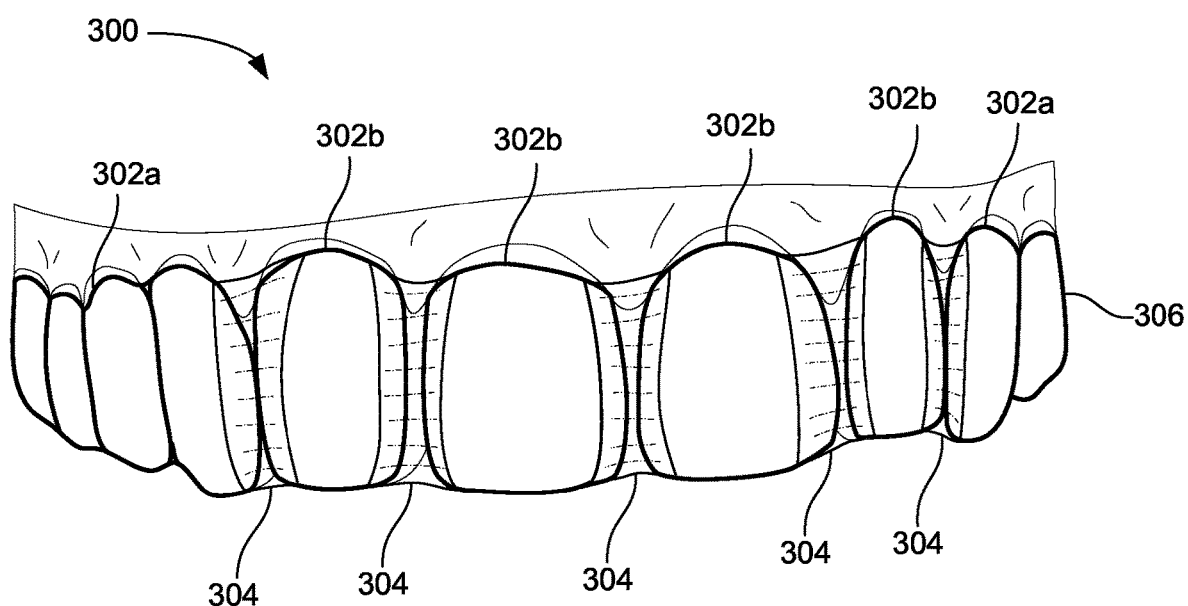
FIG. 3B illustrates the appliance of FIG. 3A placed over the teeth of a patient.
Figure 3C:
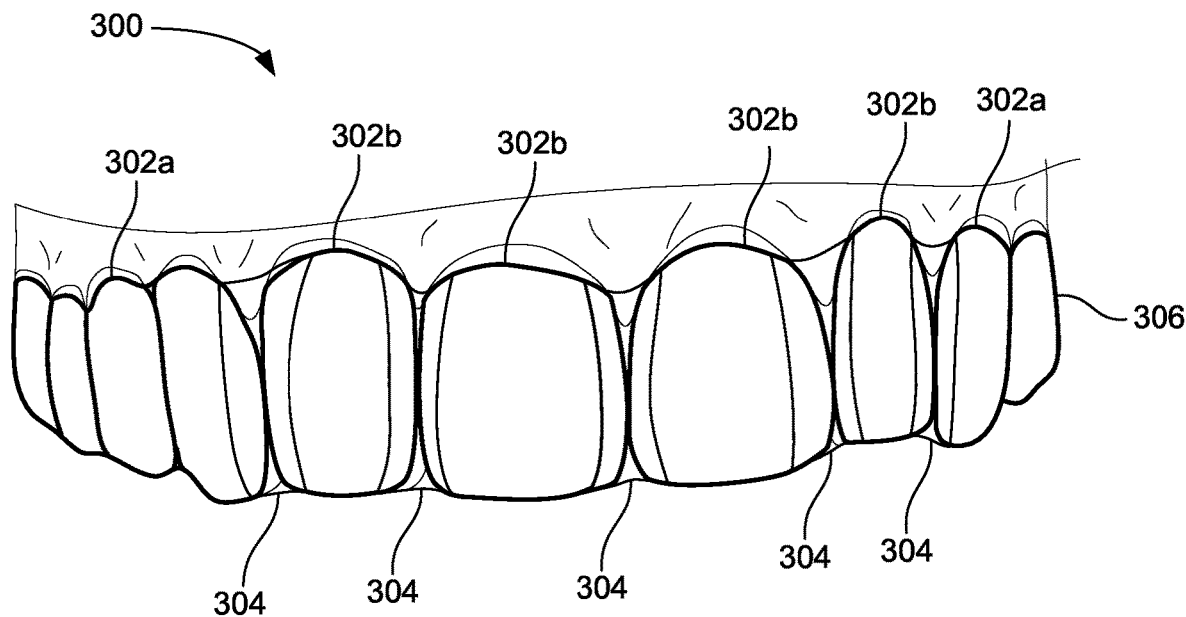
FIG. 3C illustrates the appliance of FIG. 3B after tooth repositioning has occurred.

FIGS. 3A through 3C illustrate a segmented orthodontic appliance 300, in accordance with many embodiments. The appliance 300 includes a plurality of discrete shell segments 302a, 302b and a plurality of discrete elastic segments 304 coupled together to form a single appliance shell 306. The shell segments, such as those shown as 302a, 302b, can include cavities shaped to each receive one or more of the teeth (or portions of the teeth) of a patient's dental arch. As non-limiting examples, illustrated segments 302b each receive a single tooth, whereas segments 302a each span a plurality of teeth. In additional embodiments, an orthodontic appliance can include segments spanning a single tooth, segments spanning a plurality of teeth, as well as various combinations thereof. In appliance construction, segments that span a single tooth, as well as those that span a plurality are not limited to any particular location within the arch, but the location can be selected in appliance design.

Some of the shell segments may receive a plurality of teeth (e.g., shell segments 302a), while others may receive a single tooth (e.g., shell segments 302b). In many embodiments, the shell segments 302a, 302b receive a continuous span of teeth and are separated from each other at or near the interproximal regions of the teeth. The elastic segments 304 are interspersed between the shell segments 302a, 302b at or near the aforementioned interproximal regions and couple neighboring shell segments to each other, thus forming a single appliance shell 306. In many embodiments, the resultant appliance shell 306 is translucent or transparent, so as to improve the overall aesthetics of the appliance 300 when worn by a patient.

The elastic segments 304 can be permanently affixed to the shell segments 302a, 302b so that the shell segments 302a, 302b and elastic segments 304 cannot be nondestructively detached from each other. The appliance shell 306 may be a continuous shell in which the coupled shell segments 302a, 302b and elastic segments 304 are joined without leaving any gaps or apertures between neighboring shell segments. For example, the elastic segments 304 may extend across the buccal, occlusal, and lingual surfaces of the appliance 300, thus forming a shell 306 with a continuous exterior surface. Alternatively, some of the elastic segments 304 may extend only partially across these surfaces (e.g., only across the buccal and lingual surfaces, only across the lingual and occlusal surfaces, only across the lingual surface, etc.) such that the shell 306 includes one or more gaps or apertures in its exterior surface.

The shell segments 302a, 302b can be formed from relatively rigid materials, such that the stiffness of the shell segments 302a, 302b is greater than the stiffness of the elastic segments 304. The shell segments 302a, 302b can be shaped to conform to the current topography of the patient's teeth. In such embodiments, when the shell 306 is placed over the teeth of a patient's arch, as depicted in FIG. 3B, the shell segments 302a, 302b are rigidly connected to the underlying teeth and therefore do not generate tooth repositioning forces. Conversely, the elastic segments 304 are not rigidly connected to the teeth and can therefore generate forces for eliciting movements of the underlying teeth. At least some of these forces can be generated by deformation (e.g., stretching) of the elastic segments 304 when the shell 306 is worn by the patient, due to intentional mismatch between the geometry of the shell 306 (e.g., the spatial disposition of the shell segments 302a, 302b and/or elastic segments 304) and the current arrangement of the patient's teeth. For example, when the shell 306 is worn by the patient, some of the shell segments 302a, 302b may be displaced from their original positions, thereby stretching the intervening elastic segments 304. The elastic segments 304 can be deformed before being coupled the shell and/or before the appliance is worn by the patient, such that there is an initial "pre-loading" force or tension in the elastics. Alternatively, the elastic segments 304 can be relaxed prior to wearing of the appliance, such that there is no pre-loading force before the appliance is placed on the teeth. The resistance of the elastic segments 304 to deformation may exert forces on the shell segments 302a, 302b that are transmitted to the teeth, thereby eliciting movements of one or more teeth with respect to up to six degrees of freedom of motion (e.g., translation, rotation, intrusion, extrusion, tipping, torqueing, etc.). As the teeth are repositioned, the shell segments 302a, 302b can return to their original positions, decreasing the extent of deformation of the elastic segments 304 and thus reducing the forces applied to the teeth (FIG. 3C).

In some embodiments, an orthodontic appliance can include a plurality of discrete shell segments embedded in or coated with an elastic material, such that the elastic material substantially covers or surrounds the segments. The shell segments include tooth receiving cavities, in a similar manner as described in connection with other embodiments herein. The elastic material coats or surrounds the shell segments so as to hold the segments in a desired positioning relative to other segments. When in use, teeth are received in the cavities of the appliance, including those formed by the shell segments. The elastic material may stretch or deform to allow movement of the shell segments relative to each other upon placement of the appliance over the patient's teeth. The stretched or deformed elastic material can then exert forces that are transmitted to the teeth received in the shell segments.

Figure 4:
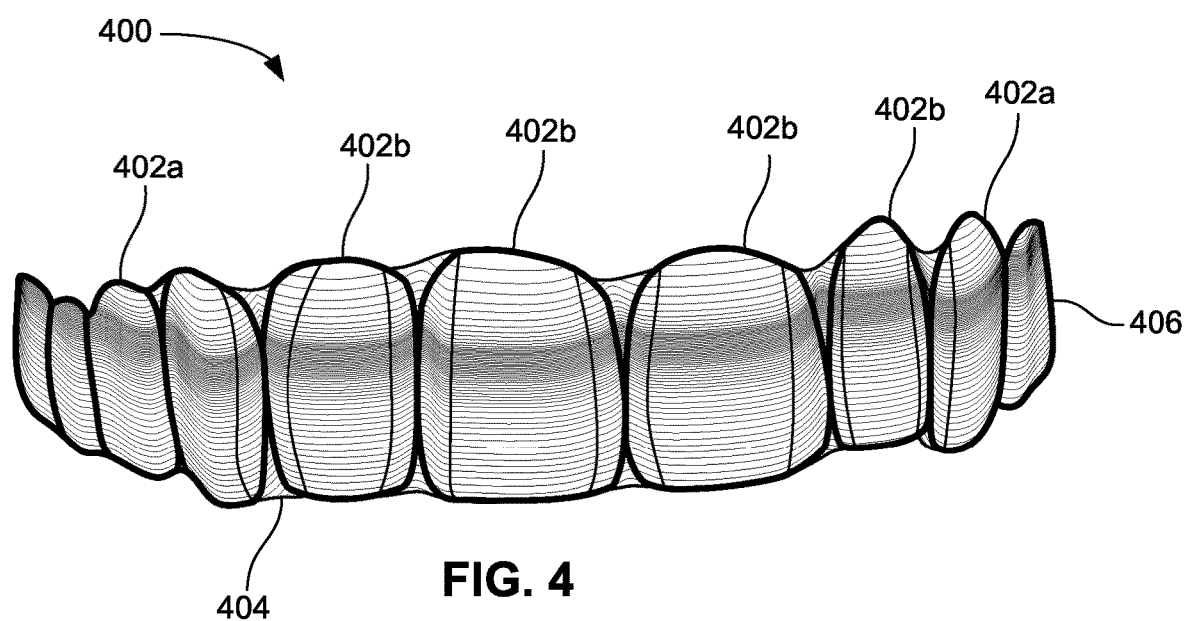
FIG. 4 illustrates another segmented orthodontic appliance, in accordance with many embodiments.

FIG. 4 illustrates a segmented orthodontic appliance 400, in accordance with many embodiments. Similar to the appliance 300, the appliance 400 includes a plurality of discrete shell segments 402a, 402b, each shaped to receive one or more teeth and separated from each other at or near the interproximal regions. The shell segments 402a, 402b are embedded in a layer of elastic material 404 which surrounds the shell segments 402a, 402b (e.g., coats the exterior and/or interior surfaces), joining them to each other at or near the interproximal regions to form a single appliance shell 406. Although the elastic material 404 is depicted in FIG. 4 as covering the entire appliance 400, in other embodiments, the elastic material 404 may cover only a portion of the appliance 400, such as the portions at or adjacent to the interproximal regions. As previously described herein, when the shell 406 is worn on the patient's teeth, the elastic material 404 can exert forces that are transmitted to the underlying teeth via the shell segments 402a, 402b for eliciting tooth movements. In many embodiments, the appliance 400 enables larger tooth movements to be produced with fewer shell segments.

Various different embodiments or configurations may be considered for an appliance having elastic material surrounding shell segments in the manner described. For example, an appliance may accommodate various different configurations for elastic materials, including different compositions and/or structures of elastic materials. Elastic material forming a layer may include a single continuous layer of elastic material or multiple layers of the same elastic material, different materials, or a combination of some layers of the same material and one or more layers of different material(s). Properties of the elastic material layer such as resiliency, elasticity, hardness/softness, color, and the like can be determined, at least partially, based on the selected material, layers of material, and/or elastic layer thickness. In some instances, the elastic material or layer can be configured such that one or more properties are uniform along a length or portion of the elastic (or entire elastic). Additionally or alternatively, one or more properties of the elastic material or layer may vary along a length or portion of the elastic (or entire elastic). Vary (or variable) may for example mean that the variations of the one or more properties are higher than 10%, higher than 25%, or higher than 50% of the highest value of the corresponding property or properties of the elastic material. For example, an elastic material or layer may have substantially uniform thickness along a length or portion (or entire elastic), or may vary along a length/portion (or entire elastic). Substantially uniform may mean that the variations (e.g., the absolute value of the difference between any two values of one property with regard to the appliance) of the one or more properties is no higher than 50%, no higher than 25%, or no higher than 10% of the highest value of the corresponding property/properties of the elastic material. As will be appreciated, characteristics of the elastic or layer may be selected so as to affect the force application to the patient's teeth or tooth movement aspects of a particular treatment desired.

Figure 5:
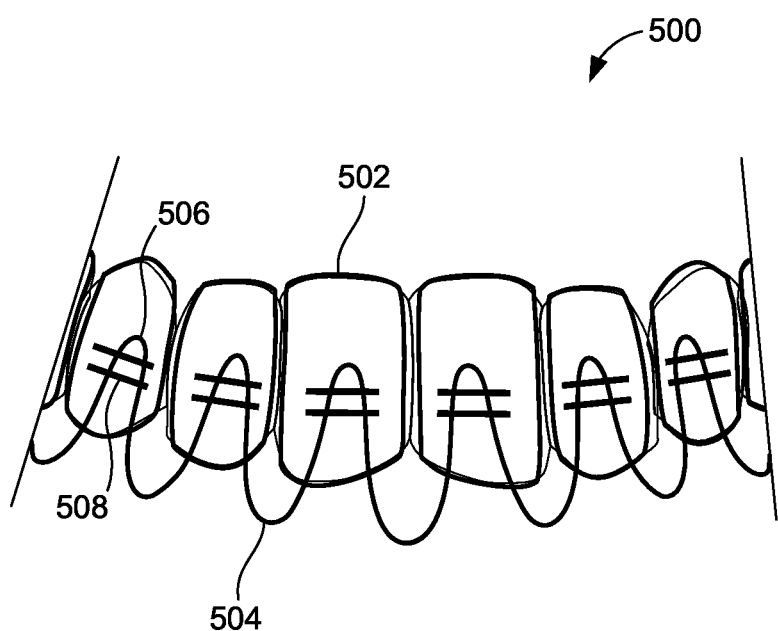
FIG. 5 illustrates a segmented orthodontic appliance with shape memory properties, in accordance with many embodiments.

FIG. 5 illustrates a segmented orthodontic appliance 500 with shape memory properties, in accordance with many embodiments. The appliance 500 includes a plurality of discrete shell segments 502. In many embodiments, each shell segment 502 is shaped to receive a single tooth. In alternative embodiments, the orthodontic appliance 500 can include segments spanning a single tooth, segments spanning a plurality of teeth, as well as various combinations thereof. The segments 502 can be coupled to each other to form a single appliance 500 by an elastic material 504, depicted in FIG. 5 as a wire. The elastic material 504 can include a plurality of attachment portions 506, with each portion 506 being coupled to a respective segment 502, e.g., via suitable adhesive or fastening elements 508 (depicted herein as pairs of bands). In the embodiment of FIG. 5, the elastic material 504 has a serpentine shape, with the attachment portions 506 being located near the occlusal portions of the serpentine shape. In alternative embodiments, the elastic material 504 can be formed with other geometries, e.g., linear, arcuate, curvilinear, etc., and the location of the attachment portions 506 can be varied as desired.

In many embodiments, the elastic material 504 is a material with shape memory properties, such as a shape memory wire, alloy, or polymer. Exemplary shape memory alloys include but are not limited to nickel-titanium, copper-aluminum-nickel, or combinations thereof. Exemplary shape memory polymers include but are not limited to polyurethane, epoxies, polyolefins, polyesters, or combinations thereof. The appliance 500 can be fabricated with the elastic material 504 having an initial, undeformed geometry that places the attached shell segments 502 in an arrangement corresponding to a target arrangement for the patient's teeth. When the appliance 500 is worn by a patient, differences between the patient's current tooth arrangement and the target arrangement can cause displacement of the shell segments 502 and therefore deformation of the elastic material 504 away from the initial geometry. The elastic material 504 can be triggered to return to its initial geometry upon application of an appropriate shape memory stimulus (e.g., temperature change, exposure to light, application of electricity), which can apply forces to the shell segments 502 and teeth to move the teeth towards the target tooth arrangement defined by the initial geometry.

The appliances described herein can be used in combination with one or more attachments mounted onto one or more of the received teeth. Accordingly, the topography of the shell segment can be modified to accommodate the attachment (e.g., with a suitable receptacle for receiving the attachment). The attachment can engage the shell segments and/or elastics to transmit repositioning forces to the underlying teeth, as previously described herein. Alternatively or in addition, the attachment can be used to retain the appliance on the patient's teeth and prevent it from inadvertently becoming dislodged. For example, teeth with no undercuts (e.g., central teeth, lateral teeth) may require an attachment to ensure correct engagement of the attachment onto the teeth, while teeth with natural undercuts (e.g., molars) may not require an attachment. The attachment can be mounted onto any suitable portion of the tooth, such as on a buccal or lingual surface of the tooth.

The appliances described herein may apply forces to some or all of the received teeth. For example, as previously described herein, some of the teeth received by the appliance can serve as anchors for holding the appliance in place (e.g., teeth received by shell segments 302a, 402a), while other teeth can be repositioned by the appliance (e.g., teeth received by shell segments 302b, 402b). Furthermore, the magnitude and direction of the forces applied to the teeth (and thus the magnitude and direction of the resultant tooth movements) can be determined based on the properties of the shell segments and/or elastics, such as number, geometry, configuration, and/or material characteristics, as described in further detail herein.

Figure 6A:
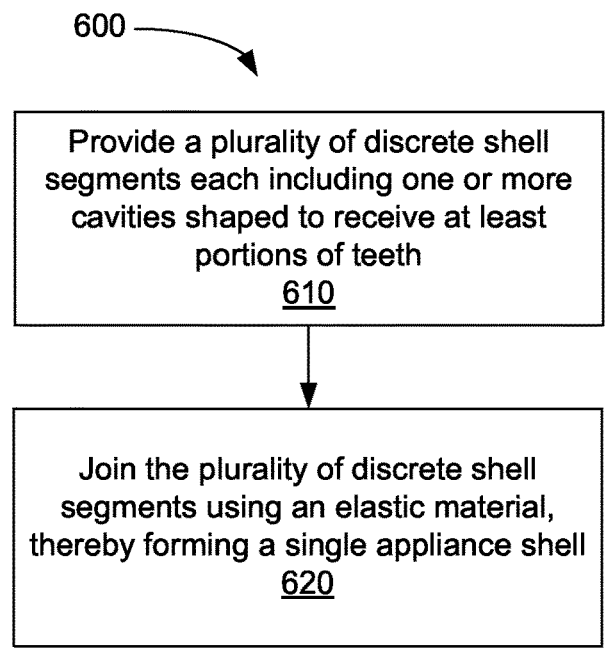
FIGS. 6A and 6B illustrate methods for creating an orthodontic appliance, in accordance with many embodiments.

FIG. 6A illustrates a method 600 for creating an orthodontic appliance, in accordance with many embodiments. The method 600 can be applied to any embodiment of the orthodontic appliances described herein. FIGS. 7A through 7D illustrate fabrication of an orthodontic appliance, in accordance with many embodiments.

Figure 7A:
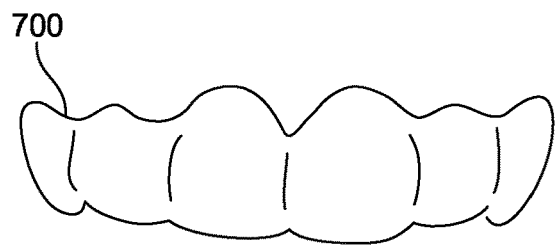
FIGS. 7A through 7D illustrate fabrication of an orthodontic appliance, in accordance with many embodiments.
Figure 7B:
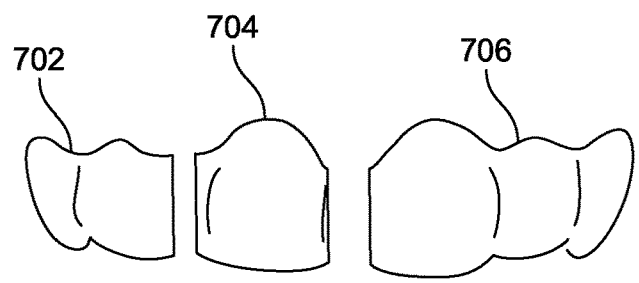

In step 610, a plurality of discrete shell segments are provided, each including one or more cavities shaped to receive at least portions of teeth (see, e.g., shell segments 702, 704, and 706 of FIG. 7B). The shell segments can collectively receive a continuous span of teeth, with separations between shell segments located at or near the interproximal regions. The number and/or shape of the shell segments can be selected to accommodate the desired tooth movements. The shell segments can be individually fabricated and provided as discrete components, or separated from a larger shell as described below. Exemplary methods for fabricating shells or discrete shell segments include thermoforming, rapid prototyping, stereolithography, or computer numerical control (CNC) milling. The material of the shell or shell segments can be translucent, such as a translucent polymer. Alternatively, the shell or shell segments can be transparent, opaque, or any other suitable level of optical clarity. The shell or shell segments can be fabricated based on a physical or digital model of the patient's teeth. The model can be generated from dental impressions or scanning (e.g., of the patient's intraoral cavity, of a positive or negative model of the patient's intraoral cavity, or of a dental impression formed from the patient's intraoral cavity).

In step 620, the plurality of discrete shell segments are joined using an elastic material, thereby forming a single appliance shell. As previously mentioned, the elastic material can be provided as a plurality of discrete segments (see, e.g., elastic segments 708 of FIG. 7C), as a layer or coating (see, e.g., elastic layer 710 of FIG. 7D), as an elongate serpentine wire, or any other suitable configuration. The elastic material can have varying levels of optical clarity. In many embodiments, the elastic material is transparent, translucent, or opaque. The elastic material can be provided as wires, strips, bands, sheets, meshes, coatings, layers, or suitable combinations thereof, and can be fabricated from any suitable material. Exemplary fabrication methods for elastics include extrusion, rapid prototyping, spraying, thermoforming, or suitable combinations thereof. The characteristics of the elastic material (e.g., length, width, thickness, area, shape, cross-section, stiffness, etc.) may be homogeneous or substantially homogeneous throughout the bulk of the elastic material, or may be variable. Substantially homogeneous may mean that the variations of the one or more properties is no higher than 50%, no higher than 25%, or no higher than 10% of the highest value of the corresponding property/properties of the elastic material. For example, different portions of the elastic layer 710 may have different thicknesses (e.g., differing by more than 10%, more than 25%, or more than 50% of the maximum thickness of the elastic layer), thereby altering the local compliance of the appliance shell. Furthermore, in some instances, the elastic can have anisotropic characteristics. As an example, the elastic may be relatively compliant along a first direction, and less compliant (or noncompliant) along a second direction. The directionality of the elastic can be used to control the direction of the resultant forces applied to the teeth. The appliances described herein may utilize a single type of elastic, or a plurality of different types of elastics. For instance, the elastic segments 708 may have different stiffnesses, thus altering the amount of force applied to each tooth (or group of teeth).

The elastic material can be coupled to the shell segments using suitable adhesives or bonding agents. In some instances, the elastic material may have adhesive properties, thus enabling the elastic to be directly coupled to the shell segments without the use of additional external agents. Exemplary methods of attaching the elastics to the shell segments include extrusion, spraying, coating, dipping, gluing, thermoforming, mechanically connecting, stitching, riveting, weaving, or suitable combinations thereof.

Figure 6B:
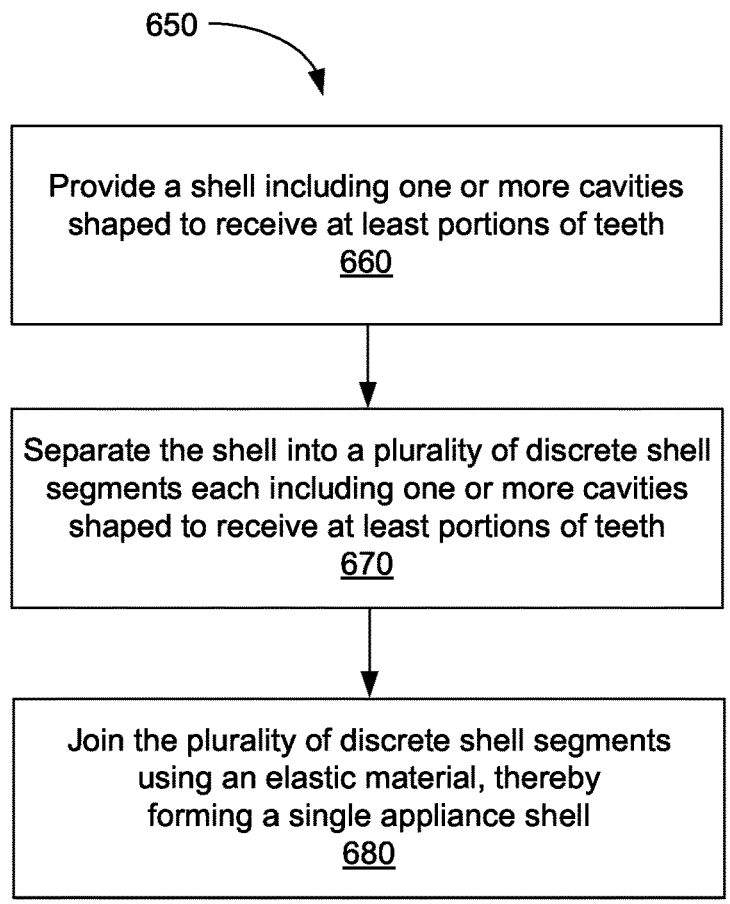

FIG. 6B illustrates a method 650 for creating an orthodontic appliance, in accordance with many embodiments. The method 650 can be applied to any embodiment of the orthodontic appliances described herein. In step 660, a shell including one or more cavities shaped to receive at least portions of teeth is provided (see, e.g., shell 700 of FIG. 7A). The shell can be fabricated based on the patient's teeth and using any suitable method, as discussed above. In step 670, the shell is separated into a plurality of discrete shell segments, each including one or more cavities shaped to receive at least portions of teeth (see, e.g., shell segments 702, 704, and 706 of FIG. 7B). The number and shape of the shell segments can be selected to accommodate the desired tooth movements. In many embodiments, the shell is separated into discrete segments by cutting the shell, e.g., at or near one or more interproximal regions.

Figure 7C:
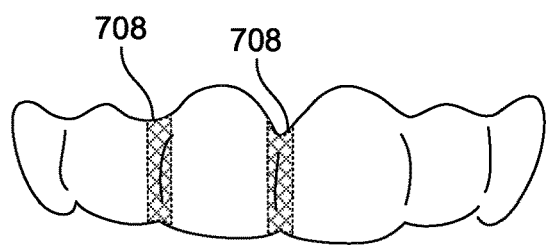
Figure 7D:
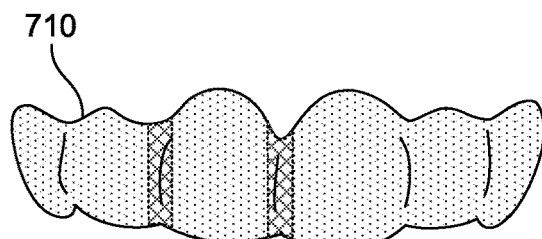

In step 680, the plurality of discrete shell segments are joined using an elastic material, thereby forming a single appliance shell (see, e.g., FIGS. 7C and 7D), as previously described herein with respect to step 620 of FIG. 6A. FIG. 7C shows an appliance including a segments joined by elastic 708. FIG. 7D shows an appliance including segments having a layer/coating 710 so as to join the segments. The geometry of the recoupled appliance shell may be different than the geometry of the initial shell provided in step 660. For example, the geometry of the initial shell may match the current arrangement of the patient's teeth, while the recoupled shell may match a desired tooth arrangement. As previously described herein, the deliberate mismatch between the desired and current arrangement can cause deformation of the elastics when the appliance is worn, thereby producing forces for repositioning the teeth to the desired arrangement.

Appliance fabrication or design can make use of one or more physical or digital representations of the patient's teeth. Representations of the patient's teeth can include representations of the patient's teeth in a current arrangement, and may further include representations of the patient's teeth repositioned in one or more treatment stages. Treatment stages can include a desired or target arrangement of the patient's teeth, such as a desired final arrangement of teeth. Treatment stages can also include one or more intermediate arrangements of teeth (e.g., planned intermediate arrangements) representing arrangements of the patient's teeth as the teeth progress from a first arrangement (e.g., initial arrangement) toward a second or desired arrangement (e.g., desired final arrangement).

Figure 8:
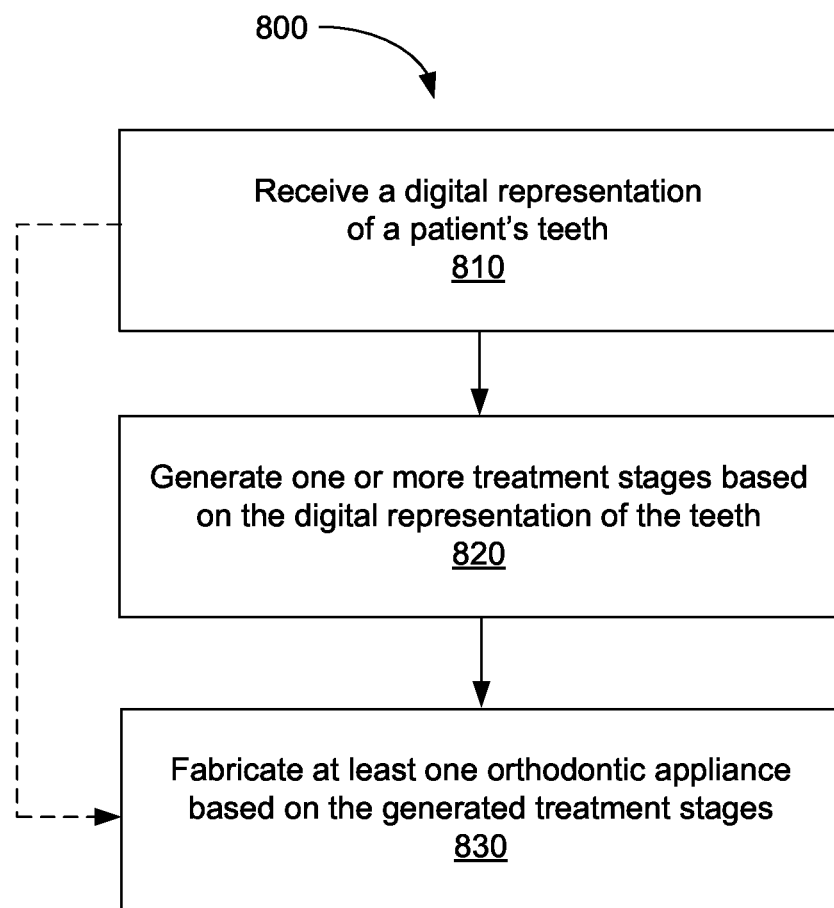
FIG. 8 illustrates a method for digitally planning an orthodontic treatment, in accordance with many embodiments.

FIG. 8 illustrates a method 800 for digitally planning an orthodontic treatment and/or design or fabrication of an appliance, in accordance with many embodiments. The method 800 can be applied to any of the treatment procedures described herein and can be performed by any suitable data processing system.

In step 810, a digital representation of a patient's teeth is received. The digital representation can include surface topography data for the patient's intraoral cavity (including teeth, gingival tissues, etc.). The surface topography data can be generated by directly scanning the intraoral cavity, a physical model (positive or negative) of the intraoral cavity, or an impression of the intraoral cavity, using a suitable scanning device (e.g., a handheld scanner, desktop scanner, etc.).

In step 820, one or more treatment stages are generated based on the digital representation of the teeth. The treatment stages can be incremental repositioning stages of an orthodontic treatment procedure designed to move one or more of the patient's teeth from an initial tooth arrangement to a target arrangement. For example, the treatment stages can be generated by determining the initial tooth arrangement indicated by the digital representation, determining a target tooth arrangement, and determining movement paths of one or more teeth in the initial arrangement necessary to achieve the target tooth arrangement. The movement path can be optimized based on minimizing the total distance moved, preventing collisions between teeth, avoiding tooth movements that are more difficult to achieve, or any other suitable criteria.

In step 830, at least one orthodontic appliance is fabricated based on the generated treatment stages. For example, a set of appliances can be fabricated, each shaped to accommodate a tooth arrangement specified by one of the treatment stages, such that the appliances can be sequentially worn by the patient to incrementally reposition the teeth from the initial arrangement to the target arrangement. The appliance set may include one or more of the segmented appliances described herein. The properties of the shell segments and elastics of such segmented appliances (e.g., number, geometry, configuration, material characteristics) can be selected to elicit the tooth movements specified by the corresponding treatment stage. At least some of these properties can be determined via suitable computer software or other digital-based approaches. The fabrication of the appliance may involve creating a digital model of the appliance to be used as input to a computer-controlled fabrication system.

In some instances, staging of various arrangements or treatment stages may not be necessary for design and/or fabrication of an appliance. As illustrated by the dashed line in FIG. 8, design and/or fabrication of an orthodontic appliance, and perhaps a particular orthodontic treatment, may include use of a representation of the patient's teeth (e.g., receive a digital representation of the patient's teeth 810), followed by design and/or fabrication of an orthodontic appliance based on a representation of the patient's teeth in the arrangement represented by the received representation. For example, a shell may be generated based on the representation of the patient's teeth (e.g., as in step 810), followed by segmentation of the shell and application of elastics to generate an appliance described in various embodiments herein.

Figure 9:
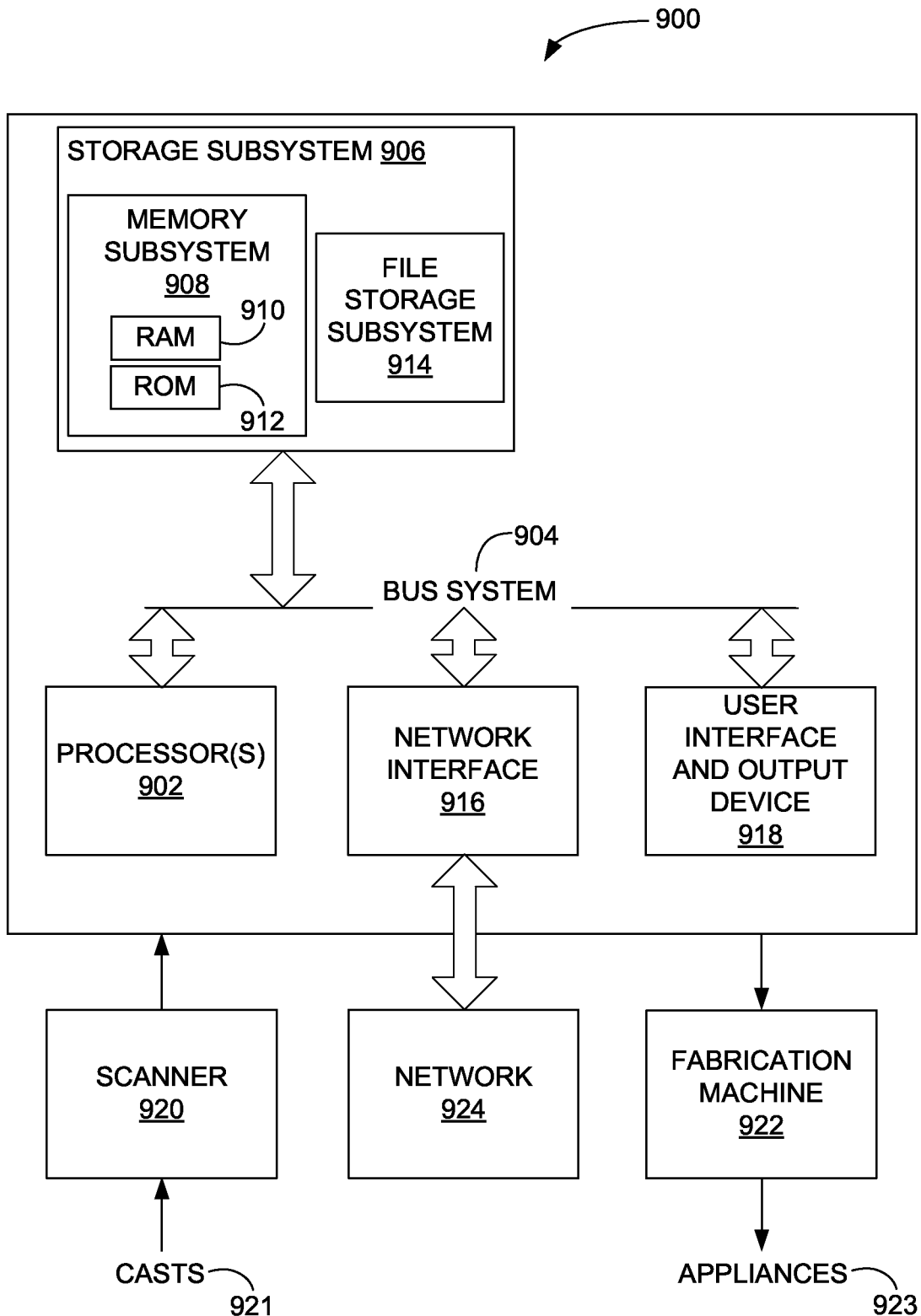
FIG. 9 is a simplified block diagram of a data processing system, in accordance with many embodiments.

FIG. 9 is a simplified block diagram of a data processing system 900 that may be used in executing methods and processes described herein. The data processing system 900 typically includes at least one processor 902 that communicates with one or more peripheral devices via bus subsystem 904. These peripheral devices typically include a storage subsystem 906 (memory subsystem 908 and file storage subsystem 914), a set of user interface input and output devices 918, and an interface to outside networks 916. This interface is shown schematically as "Network Interface" block 916, and is coupled to corresponding interface devices in other data processing systems via communication network interface 924. Data processing system 900 can include, for example, one or more computers, such as a personal computer, workstation, mainframe, laptop, and the like.

The user interface input devices 918 are not limited to any particular device, and can typically include, for example, a keyboard, pointing device, mouse, scanner, interactive displays, touchpad, joysticks, etc. Similarly, various user interface output devices can be employed in a system of the invention, and can include, for example, one or more of a printer, display (e.g., visual, non-visual) system/subsystem, controller, projection device, audio output, and the like.

Storage subsystem 906 maintains the basic required programming, including computer readable media having instructions (e.g., operating instructions, etc.), and data constructs. The program modules discussed herein are typically stored in storage subsystem 906. Storage subsystem 906 typically includes memory subsystem 908 and file storage subsystem 914. Memory subsystem 908 typically includes a number of memories (e.g., RAM 910, ROM 912, etc.) including computer readable memory for storage of fixed instructions, instructions and data during program execution, basic input/output system, etc. File storage subsystem 914 provides persistent (non-volatile) storage for program and data files, and can include one or more removable or fixed drives or media, hard disk, floppy disk, CD-ROM, DVD, optical drives, and the like. One or more of the storage systems, drives, etc may be located at a remote location, such coupled via a server on a network or via the internet/World Wide Web. In this context, the term "bus subsystem" is used generically so as to include any mechanism for letting the various components and subsystems communicate with each other as intended and can include a variety of suitable components/systems that would be known or recognized as suitable for use therein. It will be recognized that various components of the system can be, but need not necessarily be at the same physical location, but could be connected via various local-area or wide-area network media, transmission systems, etc.

Scanner 920 includes any means for obtaining a digital representation (e.g., images, surface topography data, etc.) of a patient's teeth (e.g., by scanning physical models of the teeth such as casts 921, by scanning impressions taken of the teeth, or by directly scanning the intraoral cavity), which can be obtained either from the patient or from treating professional, such as an orthodontist, and includes means of providing the digital representation to data processing system 900 for further processing. Scanner 920 may be located at a location remote with respect to other components of the system and can communicate image data and/or information to data processing system 900, for example, via a network interface 924. Fabrication system 922 fabricates appliances 923 based on a treatment plan, including data set information received from data processing system 900. Fabrication machine 922 can, for example, be located at a remote location and receive data set information from data processing system 900 via network interface 924.

As used herein A and/or B encompasses one or more of A or B, and combinations thereof such as A and B.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. Numerous different combinations of embodiments described herein are possible, and such combinations are considered part of the present disclosure. In addition, all features discussed in connection with any one embodiment herein can be readily adapted for use in other embodiments herein. It is intended that the following claims define the scope of the invention and that methods and structures within the scope of these claims and their equivalents be covered thereby.

What is claimed is:

1. An orthodontic appliance comprising:
an appliance shell configured to reposition a patient's teeth from a first arrangement toward
a second arrangement, the appliance shell comprising:
a plurality of shell segments, wherein each shell segment comprises a first material having a first elastic modulus, and wherein each shell segment comprises one or more tooth-receiving cavities, and
a plurality of elastic segments, wherein each elastic segment comprises a second material having a second elastic modulus less than the first elastic modulus,
wherein each elastic segment is coupled to a respective adjacent pair of shell segments,
wherein each elastic segment is located at an interproximal region of the appliance shell and continuously spans an occlusal, buccal, and lingual surface of the interproximal region, and
wherein, when the appliance shell is worn on the patient's teeth, each elastic segment is stretched to increase an interproximal spacing between the respective pair of adjacent shell segments, and the second material resists the stretching to apply a repositioning force to teeth received by the respective pair of adjacent shell segments.

2. The orthodontic appliance of claim 1, wherein the appliance shell has a continuous exterior surface.

3. The orthodontic appliance of claim 1, wherein a stiffness of the plurality of shell segments is greater than a stiffness of the plurality of elastic segments.

4. The orthodontic appliance of claim 1, wherein at least some of the plurality of shell segments are configured to receive and reposition a single tooth.

5. The orthodontic appliance of claim 1, wherein at least some of the plurality of shell segments are configured to receive a plurality of teeth.

6. The orthodontic appliance of claim 1, wherein each elastic segment is directly coupled to the respective adjacent pair of shell segments.

7. The orthodontic appliance of claim 1, wherein each elastic segment is coupled to the respective adjacent pair of shell segments using an adhesive.

8. The orthodontic appliance of claim 1, wherein the plurality of elastic segments are a plurality of discrete elastic segments.

9. The orthodontic appliance of claim 1, wherein the plurality of elastic segments are part of a material layer coating one or more surfaces of the appliance shell.

10. The orthodontic appliance of claim 1, wherein at least some of the plurality of elastic segments include a pre-loading force before the appliance shell is placed on the patient's teeth.

11. The orthodontic appliance of claim 1, wherein the resistance of the second material produces movement of the teeth received by the respective pair of adjacent shell segments such that the interproximal spacing between the respective pair of adjacent shell segments decreases over time.

12. A method comprising:
determining a treatment plan for a patient's teeth, the treatment plan comprising repositioning the patient's teeth from a first arrangement toward a second arrangement;
generating a digital model of an appliance shell configured to reposition the patient's teeth from the first arrangement toward the second arrangement, wherein the appliance shell comprises:
a plurality of shell segments, wherein each shell segment comprises a first material having a first elastic modulus, and wherein each shell segment comprises one or more tooth-receiving cavities, and
a plurality of elastic segments, wherein each elastic segment comprises a second material having a second elastic modulus less than the first elastic modulus,
wherein each elastic segment is coupled to a respective adjacent pair of shell segments,
wherein each elastic segment is located at an interproximal region of the appliance shell and continuously spans an occlusal, buccal, and lingual surface of the interproximal region, and
wherein, when the appliance shell is worn on the patient's teeth, each elastic segment is stretched to increase an interproximal spacing between the respective pair of adjacent shell segments, and the second material resists the stretching to apply a repositioning force to teeth received by the respective pair of adjacent shell segments; and
transmitting the digital model to a fabrication system, wherein the fabrication system is configured to fabricate the appliance shell based on the digital model.

13. The method of claim 12, wherein the fabrication system is configured to fabricate the appliance shell using a rapid prototyping process.

14. The method of claim 12, further comprising fabricating the appliance shell based on the digital model.

15. The method of claim 12, wherein the appliance shell has a continuous exterior surface.

16. The method of claim 12, wherein at least some of the plurality of shell segments are configured to receive and reposition a single tooth.

17. The method of claim 12, wherein at least some of the plurality of shell segments are configured to receive a plurality of teeth.

18. The method of claim 12, wherein each elastic segment is directly coupled to the respective adjacent pair of shell segments.

19. The method of claim 12, wherein each elastic segment is coupled to the respective adjacent pair of shell segments using an adhesive.

20. The method of claim 12, wherein the plurality of elastic segments are a plurality of discrete elastic segments.

21. The method of claim 12, wherein the plurality of elastic segments are part of a material layer coating one or more surfaces of the appliance shell.

* * * * *